United States Patent
Charney et al.

(10) Patent No.: US 6,763,432 B1
(45) Date of Patent: Jul. 13, 2004

(54) CACHE MEMORY SYSTEM FOR SELECTIVELY STORING DIRECTORY INFORMATION FOR A HIGHER LEVEL CACHE IN PORTIONS OF A LOWER LEVEL CACHE

(75) Inventors: Mark Jay Charney, New York, NY (US); Philip George Emma, Danbury, CT (US); Robert K. Montoye, Austin, TX (US); Arthur R. Zingher, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 779 days.

(21) Appl. No.: 09/649,863

(22) Filed: Aug. 28, 2000

Related U.S. Application Data

(60) Provisional application No. 60/210,858, filed on Jun. 9, 2000.

(51) Int. Cl.[7] .............................................. G06F 12/08
(52) U.S. Cl. ....................................... 711/144; 711/122
(58) Field of Search ................................. 711/122, 124, 711/118, 119, 126, 141, 144, 146

(56) References Cited

U.S. PATENT DOCUMENTS

| | | | | |
|---|---|---|---|---|
| 5,524,212 A | * | 6/1996 | Somani et al. ............... 711/121 |
| 5,829,034 A | * | 10/1998 | Hagersten et al. ........... 711/141 |
| 6,148,378 A | * | 11/2000 | Bordaz et al. ............... 711/147 |

* cited by examiner

Primary Examiner—Matthew Kim
Assistant Examiner—Matthew D. Anderson
(74) Attorney, Agent, or Firm—Louis J. Percello

(57) ABSTRACT

A cache memory system for use with an external cache system comprising at least one data array includes one or more cache data arrays and corresponding cache directory arrays. The cache memory system operates in one of at least two modes of operation. In a first mode of operation, the cache data arrays store data relating to directory information stored in the corresponding cache directory arrays. In a second mode of operation, at least a portion of the cache data arrays stores directory information corresponding to the at least one data array of the external cache system.

6 Claims, 4 Drawing Sheets

CACHE MEMORY SYSTEM FOR SELECTIVELY STORING DIRECTORY INFORMATION FOR A HIGHER LEVEL CACHE IN PORTIONS OF A LOWER LEVEL CACHE

CROSS-REFERENCE TO RELATED APPLICATIONS

This application claims the benefit of U.S. Provisional Patent Application Serial No. 60/210,858 filed on Jun. 9, 2000.

BACKGROUND OF THE INVENTION

1. Field of the Invention

The present invention relates generally to cache memory systems, and more particularly relates to a cache memory architecture for selectively storing directory information corresponding to a higher level cache data array in at least a portion of a lower level cache data array.

2. Description of the Prior Art

It is well known in the art that the performance of a microprocessor system can be significantly improved by introducing a comparatively small but fast memory between the processor and main memory. Quite often, a small amount of cache memory (e.g., L1 cache) is included on-chip with the processor, with larger cache arrays being provided at one or more next higher levels external to the processor (e.g., L2 and L3 cache). The cache memory may be organized to include one or more directory arrays and corresponding data arrays. Directory arrays hold metadata which provides information relating to the data stored in the data arrays.

An important disadvantage with conventional cache memory systems, however, is that such cache systems have a fixed use and geometry (i.e., physical size), and therefore must be individually adapted to the architecture supported by the processor chip/module. Another disadvantage of conventional cache memory structures is that with the requirement for increasingly larger cache data arrays, the size of the corresponding directory arrays increases accordingly, thereby resulting in the need for larger cache memory systems which significantly increases the cost of the overall system.

There remains a need, therefore, in the field of cache memory systems for a cache memory architecture that can utilize at least portions of a lower level cache data array to selectively store directory information relating to a higher level cache data array.

SUMMARY OF THE INVENTION

The present invention is tantamount to a departure from the prior art because of the all-encompassing new characteristics. A system formed in accordance with the present invention revolutionizes the field of cache memory systems by selectively permitting the use of a conventional cache data array as a directory array for an off-chip data array of a higher level cache system. Using this unique architecture, several different off-chip cache topologies can be easily supported so as to meet the caching requirements of various systems and applications (e.g., high-end commercial, low-end commercial and scientific applications). These and other improvements and advantages of the present invention are made possible, at least in part, by including a secondary tag match unit operatively coupled to at least one conventional on-chip cache data array. The secondary tag match unit can be similar, at least in terms of design and function, to a conventional tag match typically associated with an on-chip cache directory.

These and other features and advantages of the present invention will become apparent from the following detailed description of illustrative embodiments thereof, which is to be read in connection with the accompanying drawings, wherein like elements are designated by identical reference numerals throughout the several views.

DETAILED DESCRIPTION OF THE PREFERRED EMBODIMENTS

Figure 1A:
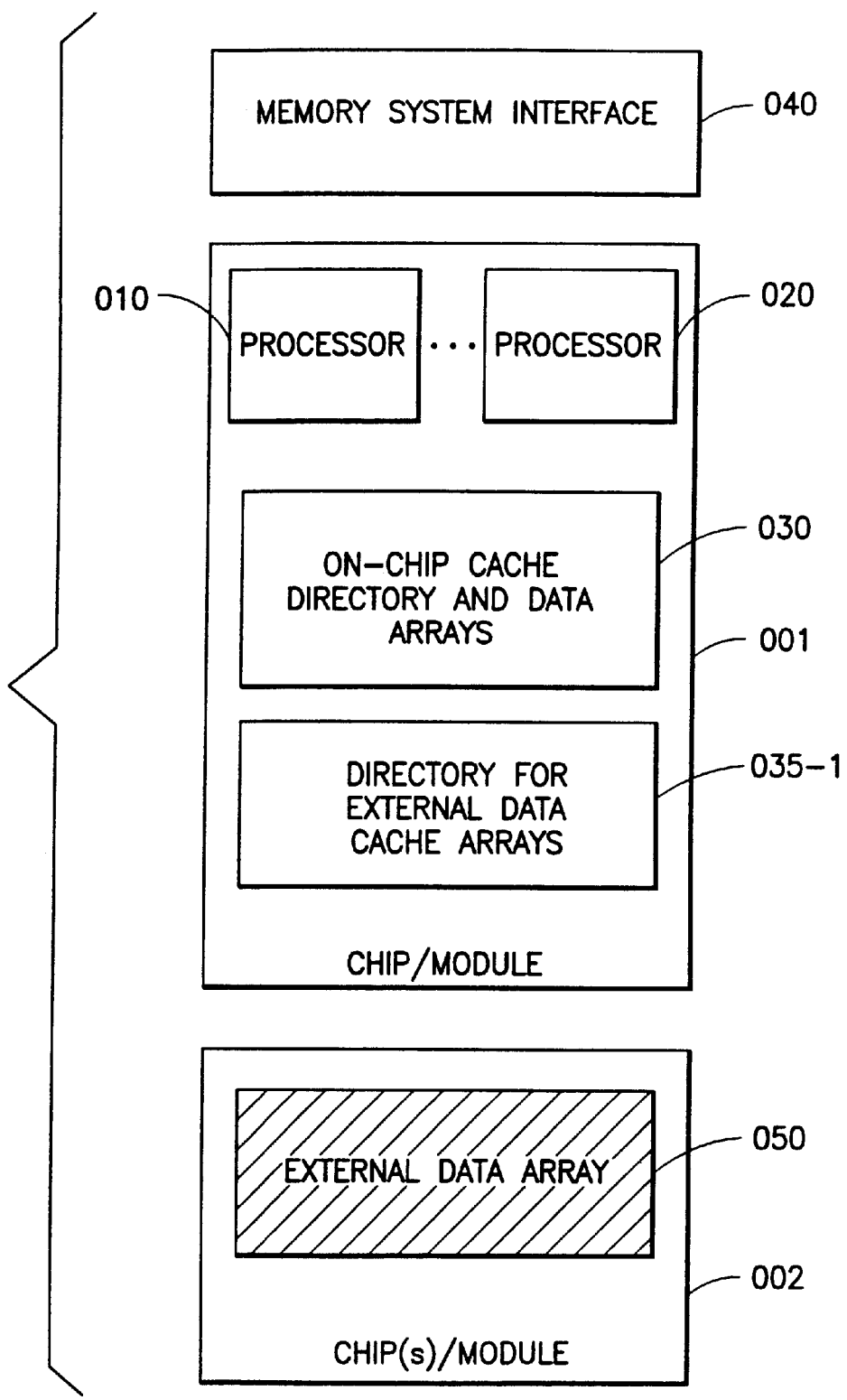
FIG. 1A is a functional block diagram illustrating a conventional computer processing system that includes an on-chip cache system comprising directory arrays and corresponding data arrays, wherein the directory for a corresponding off-chip next level cache system is included on the same chip/module as the on-chip cache.
Figure 1B:
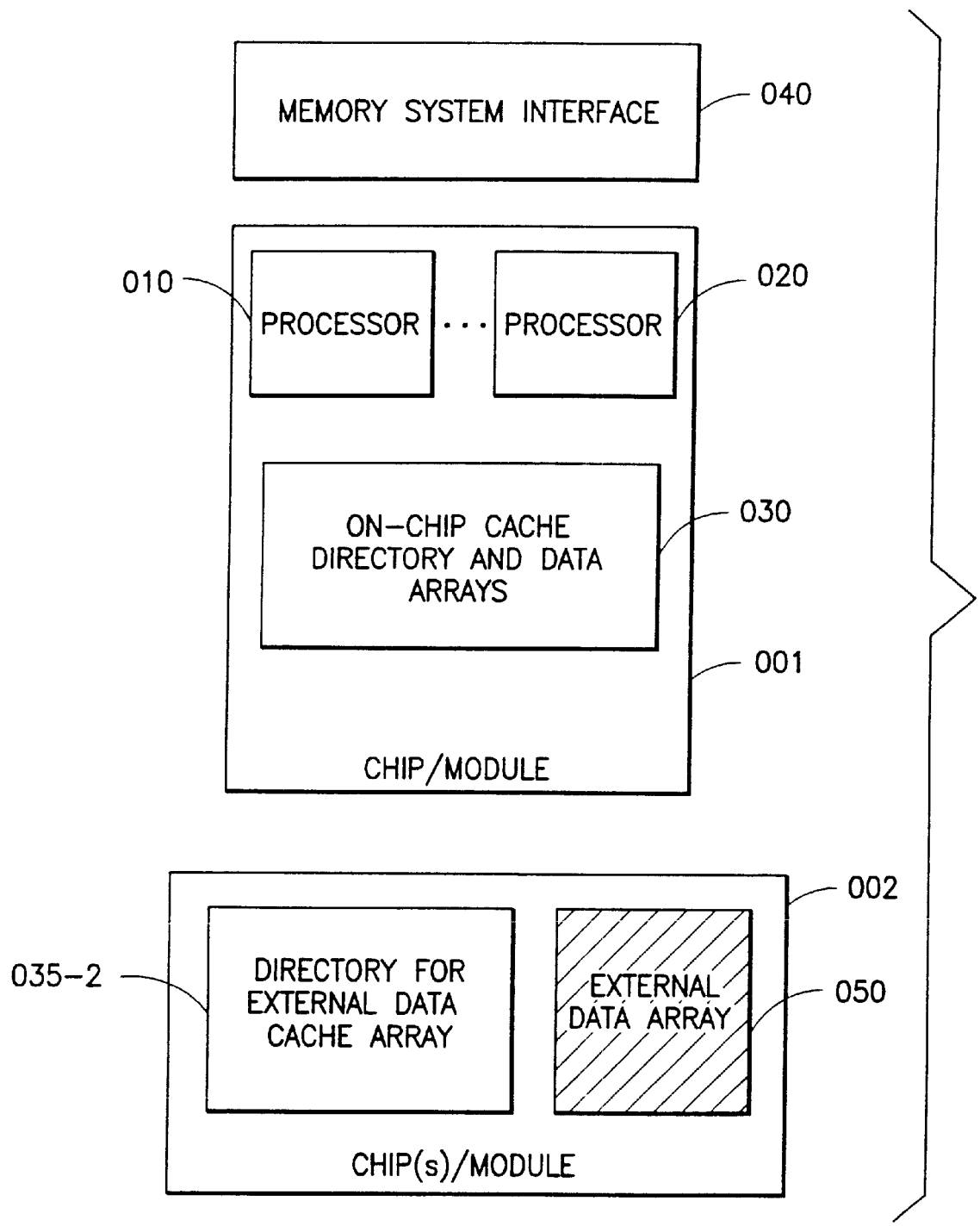
FIG. 1B is a functional block diagram illustrating a conventional computer processing system that includes an on-chip cache system comprising directory arrays and corresponding data arrays, wherein the directory for a next level cache system is included on the same chip/module as the data arrays of the next level cache system.

FIGS. 1A and 1B depict a functional block diagram of a conventional computer processing system which includes an on-chip cache system, comprising directory arrays and corresponding data arrays, and off-chip data arrays for the next higher level cache system. As shown in FIG. 1A, a directory 035-1 for a corresponding off-chip next level cache system 002 may be included on the same chip or module 001 as the on-chip cache 030. As an alternative topology, FIG. 1B shows a directory 35-2 for the next higher level cache system 002 included on the same chip/module 002 as the corresponding data array 050 of the next higher level system.

Figure 2:
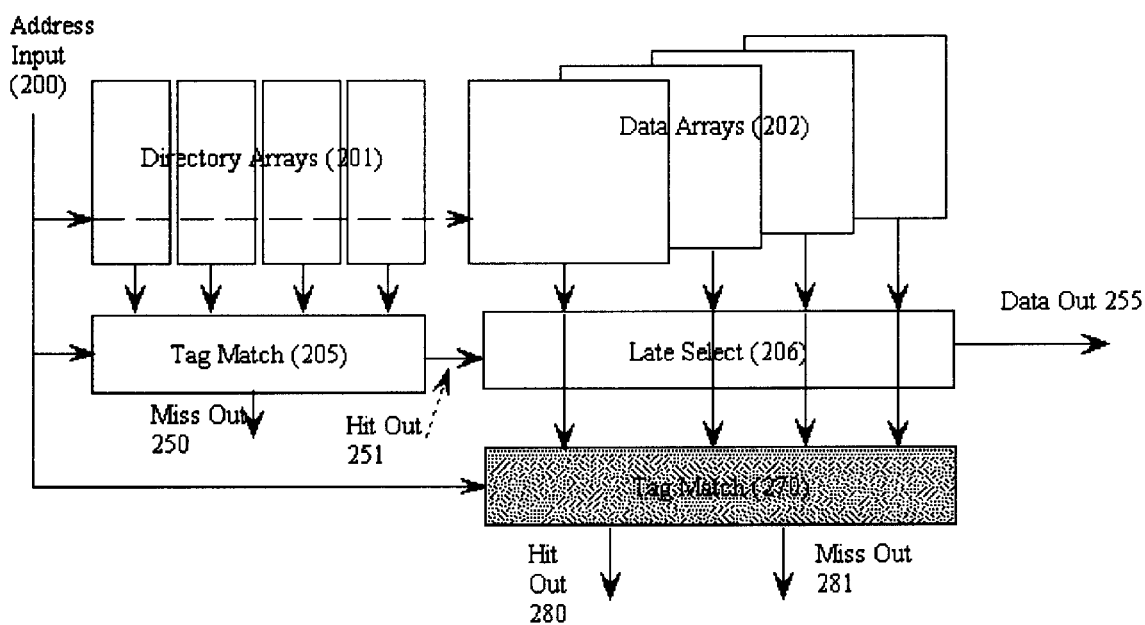
FIG. 2 is a functional block diagram illustrating a cache memory system, formed in accordance with one embodiment of the present invention, wherein all of the data arrays are used as a directory for an off-chip data array.

In essence, the present invention preferably utilizes at least a portion of the conventional data array(s) as a directory for a corresponding external (off-chip) data array(s) of the next higher level cache system. As shown in FIG. 2, in order to realize this novel architecture, the data array portion 202 of the cache is augmented with a secondary tag match unit 270 or equivalent match logic which is similar to the tag match unit 205 normally associated with a conventional cache directory 201. Tag match 270 is operatively connected to the cache data arrays 202 and to the address input 200 and preferably includes one or more signal outputs to indicate to the external higher level cache system whether a cache "hit" (e.g., Hit out 280) or "miss" (e.g., Miss out 281) has occurred.

With continued reference to FIG. 2, the cache memory architecture of the present invention is preferably operable in at least two different modes. In the first mode (Mode 1), tag match 205 is preferably enabled and tag match 270 is disabled. In this essentially conventional mode of operation, the data arrays 202 are used as a conventional collection of data arrays and no directory tags or similar directory information is stored in the data arrays 202. Accordingly, in this mode the data arrays 202 are not used to support an external cache. In a second mode of operation (Mode 2), tag match 205 is preferably disabled and tag match 270 is enabled. In this second mode, the data arrays 202 are preferably used for maintaining/storing directory information corresponding to a next higher level external cache system. Preferably, the operational mode is selected based upon data stored in a configuration register. It is to be appreciated that the mode of operation may be changed "on the fly," under the control of a user (e.g., manually), a program (i.e., automatically) or otherwise, as required by a particular application or system.

Figure 3:
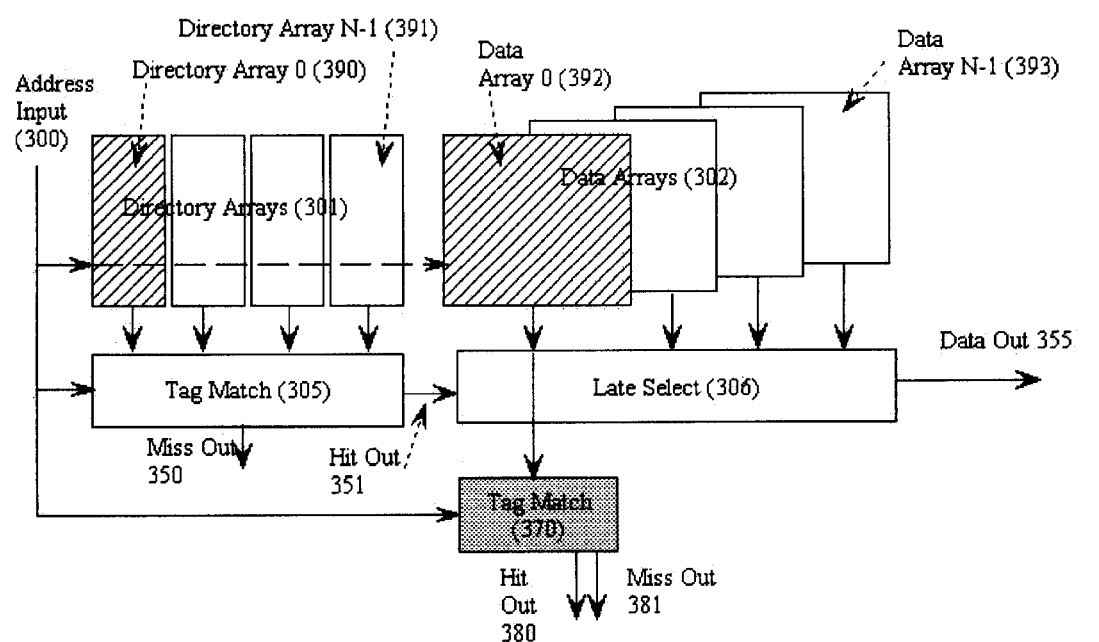
FIG. 3 is a functional block diagram illustrating a cache memory system, formed in accordance with a second embodiment of the present invention, wherein portions of the data arrays are used to store directory information for external next-level cache.

When operating in Mode 2, directory information pertaining to an external data array 050 (see FIG. 1A or 1B) is preferably stored in the cache data arrays 202, and the conventional cache directory arrays 201 and late select unit 206 may be disabled or otherwise not used. It is to be appreciated that in the preferred embodiment of FIG. 2, all cache data arrays are used to store directory information for the next higher level external cache during Mode 2 operation. The present invention, however, similarly contemplates that only a portion(s) of the data arrays 202 may be used to maintain such external cache directory information, as shown in FIG. 3 and described in further detail herein below. In this alternative configuration, the directory arrays 201 and late select 206 may be employed for the remaining data arrays which are used in the conventional sense. Even assuming all cache data arrays 202 are used to store higher level cache directory information, the cache directory arrays 201 may also be employed as additional storage space for external cache directory information, such as to increase the address bit width used to address the higher level cache data arrays.

As appreciated by those skilled in the art, conventional directory arrays 201 or supporting structures preferably maintain, for each entry in the corresponding data arrays 202:

(1) a subset of the address, called the tag, that is used in the tag match operation to determine if the corresponding location in the data array is present in the cache;

(2) data-state information (e.g., modified, shared, exclusive, invalid); and (3) data replacement information (typically some variant of a least-recently-used policy).

Depending upon the mode of operation, this information may be stored in the cache data array 202 for the maintenance of an external cache data array 050 (see FIG. 1A or 1B). If the tag match 270 indicates that data corresponding to a specific address input 200 is present in the external data array, a Hit Out 280 signal (indicating a cache "hit") from the tag match unit 270, along with the address input 200, can be used to retrieve or otherwise access the data from the external cache data array. If the tag match 270 indicates that such data is not present in the external cache data array, for example by indicating a cache "miss" on a Miss Out 281 signal line, then the address input 200 can be used to retrieve the data from another level of the memory hierarchy. A more detailed description of exemplary cache systems may be found in Harold Stone, "High Performance Computer Architecture", Addison-Wesley Publishing Co., 1987, pgs. 29–39, herein incorporated by reference in its entirety.

By way of example only, consider that a 4 megabyte (MB) on-chip cache that has 128 byte lines has, by definition, $2^{15}$ (or 32,768) entries. If the cache is four-way set-associative, for instance, then those $2^{15}$ entries are arranged in $2^{13}$ (or 8,192) groups of four. Thus, each of the $2^{13}$ rows of the data array has 4×128 bytes=512 bytes=4096 bits in which to store directory information for an off-chip external higher level cache data array. If the address space requires 40 bits to address memory and the external cache data array is arranged in 128 byte lines, and since 13 bits are used to select a row of the cache, there would be 20 bits required per tag in each directory entry. Each directory entry, as stated above, will also require information used to track the data-state and for controlling data replacement decisions.

In an alternative embodiment of the present invention illustrated in FIG. 3, predefined portions of the directory arrays 301 and corresponding data arrays 302 of the cache system are operated in a conventional manner, while one or more other predetermined portions 392 of the cache data arrays are preferably used to store directory information relating to an off-chip next-level cache system (not shown). More specifically, the cache system depicted in FIG. 3 is preferably operable in one of at least two different modes. In a first mode (Mode 1), the conventional tag match unit 305 is preferably enabled and secondary tag match unit 370 is disabled. In this mode, in a cache system having N data arrays (0 through N−1) and N corresponding directory arrays, data array 0 392 and the remaining N−1 directory arrays, along with directory array 0 390 and remaining N−1 directory arrays, are used in a conventional fashion and no directory tags or information relating to the external higher level cache are stored in the data arrays 302. In essence, this mode does not utilize the data arrays 302 to support an external cache system.

With continued reference to FIG. 3, in a second mode of operation (Mode 2), tag match 305 is preferably enabled and tag match 370 is enabled. In this mode, at least one of the cache data arrays (e.g., data array 0 392) is used for maintaining directory information/tags for a next higher level external cache system (not shown). The remaining portion(s) of the cache data arrays 302 and corresponding cache directory arrays 301 (e.g., non-shaded data and directory arrays) are preferably used in their conventional manner.

As previously mentioned, it is preferred that the operational mode of the system is selected based upon data values stored in a configuration register, although the present invention similarly contemplates that the mode of operation may be hardwired or otherwise fixed. When operating in Mode 2, the directory information stored in the data array 392 is used for the maintenance of an external cache data array. More specifically, if the tag match 370 indicates that data corresponding to the address input 300 is present in the external cache data array, the Hit Out signal 380 and address input 300 may be used to retrieve/access the data from the external cache data array. If the tag match 370 indicates that such data is not present in the external cache data array, by indicating a "miss" on the Miss Out signal line 381, the address input 300 can be used to retrieve the desired data from the next higher level of memory in the system hierarchy.

An exemplary cache system illustrating the alternative embodiment of the present invention, as discussed herein above and shown in FIG. 3, will now be described. This example is used for illustrative purposes only and is not meant to limit the present invention to the precise embodiment described. Assume, for example, that the cache architecture is a 4 MB L2 cache with four-way set-associativity, and 128 byte lines. This cache system includes four 1 MB cache data arrays which are used as follows:

(1) in Mode 1, the four 1 MB cache data arrays are used in a conventional manner;
(2) in Mode 2,
   (i) System A: three of the four 1 MB cache data arrays are used in a conventional manner; however, one of the four 1 MB cache data arrays is used to store directory information for a 64 MB L3 cache system (direct mapped, 128 byte lines); or
   (ii) System B: one of the four 1 MB cache data arrays is used in a conventional manner, however, three of the four 1 MB cache data arrays are used to store directory information for a 160 MB L3 cache system (five-way set-associative, 128 byte lines).

This cache system assumes a 40 byte address space, wherein the row and column offsets, together, select a single L3 congruence class (group of directory entries) stored in the L2 data arrays.

More specifically, for this example consider that the following are address fields, with bit widths indicated for the above mentioned L2 cache for the two possible L2/L3 cache configurations:

| L2 address fields | | Tag (20b) | Row Offset (13b) | Line Offset (7b) |
|---|---|---|---|---|
| L2/3 address fields (system A) | Tag (14b) | Column Offset (6b) | Row Offset (13b) | Line Offset (7b) |
| L2/3 address fields (system B) | Tag (15b) | Column Offset (5b) | Row Offset (13b) | Line Offset (7b) |

With reference to the above illustrative example, Table 1 below provides comparisons for each of the two systems A and B described above.

TABLE 1

Comparison of Example System A and System B

| SYSTEM A | SYSTEM B | DESCRIPTION |
|---|---|---|
| 4 MB | 4 MB | L2 capacity |
| 128 | 128 | Bytes/line |
| 7 | 7 | Line offset (bits) |
| 4 | 4 | L2 associativity |
| 8192 | 8192 | L2 rows |
| 40 | 40 | Address space (bits) |
| 13 | 13 | Row index (bits) |
| 6 | 5 | Column offset index (bits) |
| 14 | 15 | L3 - No. of tag bits |
| 2 | 2 | L3 - No. of state bits |
| 16 | 17 | L3 - No. of tag and state bits |
| 1 | 5 | L3 associativity |
| 16 | 85 | No. of tag and state bits |
| 0 | 7 | LRU bits |
| 16 | 92 | Bits/congruence class (L3 directory entry) |
| 1024 | 1024 | Bits/array |
| 64 | 11.13 | Congruence classes/array |
| 1 | 3 | No. of L2 data arrays storing L3 directory info |
| 64 | 32 | Congruence classes/row |
| 1024 | 2944 | Bits used |
| 0 | 128 | Bits unused in array |
| 3 | 1 | No. of L2 data arrays used in conventional manner |
| 3145728 | 1048576 | L2 capacity (bits stored in L2 data array(s) for conventional use) |
| 64 MB | 160 MB | L3 capacity (bits stored in L3 data array(s) for conventional use) |

As can be seen from the above example, although the present invention has been described herein primarily with reference to L1 cache data arrays used to store directory information for a next higher level cache system (e.g., L2 or L3 cache), it is contemplated that the cache architecture of the present invention may be similarly applied, in a broader sense, to the use of a cache data array (or portions thereof) of any cache level for selectively storing directory information for a higher level cache structure (either on-chip or external).

A cache memory system formed in accordance with the present invention provides an expansion of the higher level cache memory space by selectively permitting the use of a conventional lower level cache data array as a directory array corresponding to a data array of the next higher level cache system. Using this unique cache architecture, several different off-chip cache topologies can be easily supported so as to meet the caching requirements of various systems and applications.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the present invention.

What is claimed is:

1. A cache memory system for use with an external cache system including at least one data array, the cache memory system comprising:

at least one cache data array and corresponding cache directory array; and wherein, the cache memory system is operational in at least one of:

a first mode, wherein in the first mode of operation the at least one cache data array stores data relating to directory information stored in said corresponding cache directory array; and a second mode, wherein in the second mode of operation at least a portion of the at least one cache data array stores directory information relating to the at least one data array of said external cache system.

2. The system of claim 1, wherein said cache memory system selectively operates in one of said first mode and second mode based upon data stored in a configuration register.

3. The system of claim 1, wherein said cache memory system further comprises match logic operatively connected to at least a portion of said at least one cache data array, the match logic including an address input operatively connected thereto, the match logic being enabled in the second mode of operation and determining if directory information obtained from the at least one cache data array connected to the match logic indicates that data corresponding to an address supplied to the address input is present in said data array of the external cache system.

4. The system of claim 3, wherein said match logic is disabled in the first mode of operation.

5. The system of claim 3, wherein the match logic further includes at least one output, said at least one output providing an indication that at least one of a cache miss and a cache hit has occurred.

6. The system of claim 1, wherein in the second mode of operation, the at least one cache directory array stores directory information relating to said at least one data array of said external cache system.

* * * * *